United States Patent
Lester et al.

(10) Patent No.: US 6,369,795 B1
(45) Date of Patent: *Apr. 9, 2002

(54) MOUSEPAD TELEPHONE

(75) Inventors: Leland Lester; David Iglehart, both of Austin; Larry W. Coons, Cedar Park; Michael Duncan, Austin, all of TX (US)

(73) Assignee: Siemens Information and Communication Mobile LLC, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/543,605

(22) Filed: Apr. 5, 2000

Related U.S. Application Data

(62) Division of application No. 09/053,610, filed on Apr. 1, 1998, now Pat. No. 6,061,446.

(51) Int. Cl.$^7$ ................................................ G09G 5/00
(52) U.S. Cl. .................. 345/156; 345/168; 345/173; 345/905; 379/428.01; 379/429; D14/458; D14/459
(58) Field of Search ................................. 345/168, 173, 345/156, 905; 379/90, 110, 61, 428.01, 429; 709/225; 248/127, 118; D14/458, 459

(56) References Cited

U.S. PATENT DOCUMENTS

| | | | |
|---|---|---|---|
| 4,748,574 A | | 5/1988 | Tuchto |
| 5,220,598 A | * | 6/1993 | Bock ........................... 379/110 |
| 5,375,165 A | * | 12/1994 | Haber et al. ................... 379/90 |
| 5,413,294 A | * | 5/1995 | Greenquist ................... 248/127 |
| 5,457,454 A | | 10/1995 | Sugano |
| D364,397 S | | 11/1995 | Bedol |
| D370,472 S | | 6/1996 | Scianna |
| 5,625,673 A | * | 4/1997 | Grewe et al. ................... 379/61 |
| 5,628,483 A | * | 5/1997 | Smith et al. ................. 248/118 |
| 5,667,320 A | | 9/1997 | Ambrose et al. |
| 5,681,220 A | | 10/1997 | Bertram et al. |
| 5,717,430 A | * | 2/1998 | Copland et al. ............. 345/168 |
| 5,831,597 A | * | 11/1998 | West et al. ................... 345/163 |
| D402,276 S | * | 12/1998 | Yu .............................. D14/458 |
| 6,044,403 A | * | 3/2000 | Gerszberg et al. .......... 709/225 |

FOREIGN PATENT DOCUMENTS

JP 10301711 * 4/1997 ............. G06F/3/33

* cited by examiner

Primary Examiner—Bipin Shalwala
Assistant Examiner—David L. Lewis

(57) ABSTRACT

An improved mousepad (100) includes a telephone integrated therewith. A keypad (108) for the telephone is disposed beneath a mylar layer (130). The keypad (108) includes a plurality of capacitive switches (108a, 108b) disposed just beneath the mylar layer. In a mousepad mode, a mouse may be moved around the surface of the mylar in the standard fashion. In a telephone mode, the user may activate the keypad (108) by pressing the buttons which are viewable beneath the mylar.

5 Claims, 9 Drawing Sheets

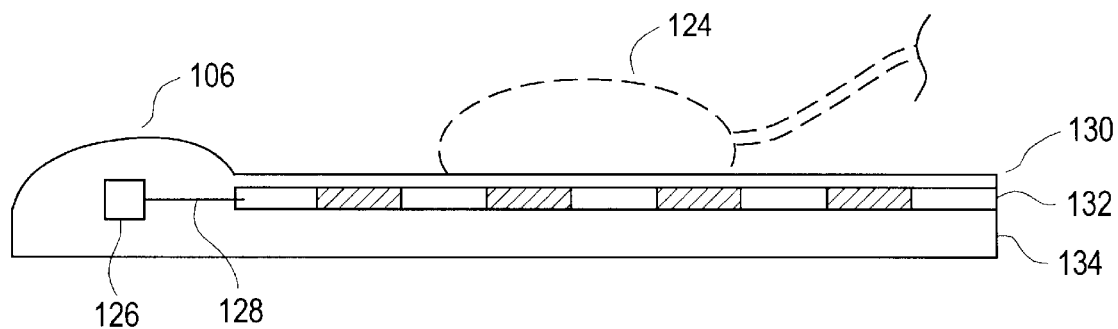
FIG. 3
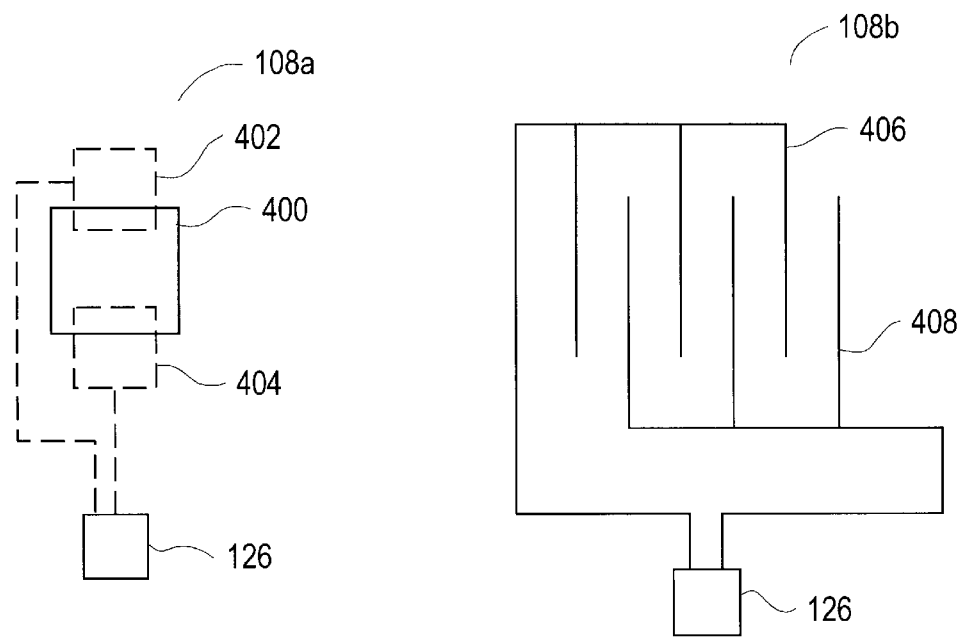
FIG. 4a
FIG. 4b

MOUSEPAD TELEPHONE

This is a divisional, of application Ser. No. 09/053,610 filed Apr. 1, 1998, now U.S. Pat. No. 6,061,446.

BACKGROUND OF THE INVENTION

1. Field of the Invention

The present invention relates generally to computer mousepads, and particularly, to computer mousepads having advanced functionality.

2. Description of the Related Art

The computer mouse has become a standard peripheral for the personal computer. Typically, mousepads are provided to enable the mouse to operate more efficiently. Such mousepads provide a surface which enhances the movement of the mouse body relative to the mouse ball for a more effective manipulation of the cursor on the computer screen.

However, the amount of desk space within arm's reach of a seated person is significantly limited, and for convenience, people typically want to place as many objects as possible in this relatively small space directly in front of them. For many people, the single largest space-consuming item is the computer and associated peripheral devices, which typically include a monitor, a keyboard, and the mousepad, in addition to the housing for the computer itself. In addition, a telephone is typically disposed adjacent to the computer. For a person seated in chair in front of a computer, very little desk space remains immediately within reach. Such desk space may be needed for placement of documents and other working materials.

Accordingly, there is a need for an improved desk configuration. There is a still further need to minimize the number of devices disposed on working surfaces within an office. There is a still further need for an advanced functionality mousepad.

SUMMARY OF THE INVENTION

These and other drawbacks in the prior art are overcome in large part by an improved mousepad according to the present invention. An improved mousepad according to one embodiment of the present invention includes a telephone integrated therewith. A keypad for the telephone is disposed beneath a mylar layer. The keypad includes a plurality of capacitive switches disposed just beneath the mylar layer. In a mousepad mode, a mouse may be moved around the surface of the mylar in the standard fashion. In a telephone mode, the user may activate the keypad by pressing the buttons which are viewable beneath the mylar.

A mousepad according to another embodiment of the invention includes a telephone integrated therewith, and further includes a keyboard platform disposed adjacent the combined mousepad telephone. According to another embodiment, the mousepad telephone is integrated with the keyboard itself.

BRIEF DESCRIPTION OF THE DRAWINGS

A better understanding of the present invention is obtained when the following detailed description is considered in conjunction with the following drawings in which:

FIG. 3 is a side view of a mousepad according to an embodiment of the present invention;

FIGS. 4A and 4B are diagrams of capacitive switches for use in a mousepad according to the present invention;

DETAILED DESCRIPTION OF THE INVENTION

Figure 1:
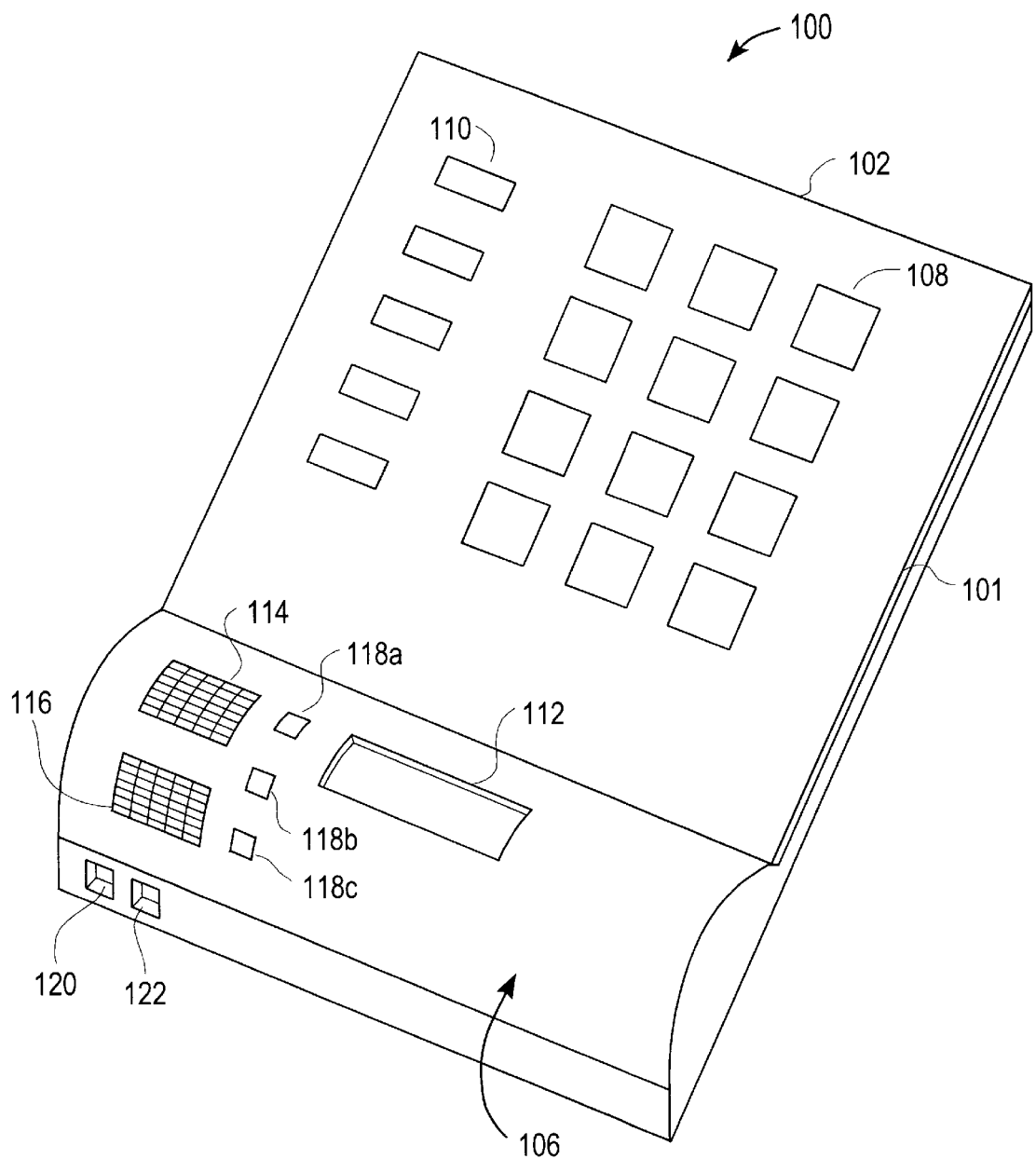
FIG. 1 is a diagram illustrating a mousepad telephone according to one embodiment of the present invention.

Referring to the drawings, and especially to FIG. 1, a mousepad telephone embodying the present invention is shown therein and generally identified by reference numeral 100. The mousepad 100 includes a working area 102. The working area 102 may include a keypad 108, as well as one or more function keys 110. As will be discussed in greater detail below, the mousepad 100 is configured such that the working area 102 may be used as a mousepad in a mousepad mode and may be used as a telephone input device via the keypad 108 in a telephone mode. As will be discussed in greater detail below, the keypad 108 and function keys 110 may be embodied in capacitive switches positioned at or below the surface of the working area 102.

A control unit 106 may be disposed adjacent the working area 102. As shown, the control unit 106 is configured such that it may be used as a wrist rest for a user using a mouse on the working area 102. The control unit 106 may be formed from either rigid or relatively pliable material. The control unit 106 includes a microphone 114 and a speaker 116. The speaker and microphone 114, 116 provide for speaker phone functionality. The control unit 106 further includes one or more function switches 118a–118c, such as a hook switch and a viewing window 112. In addition, one or more jacks 120, 122, such as RJ-11 jacks, may be provided.

Figure 2:
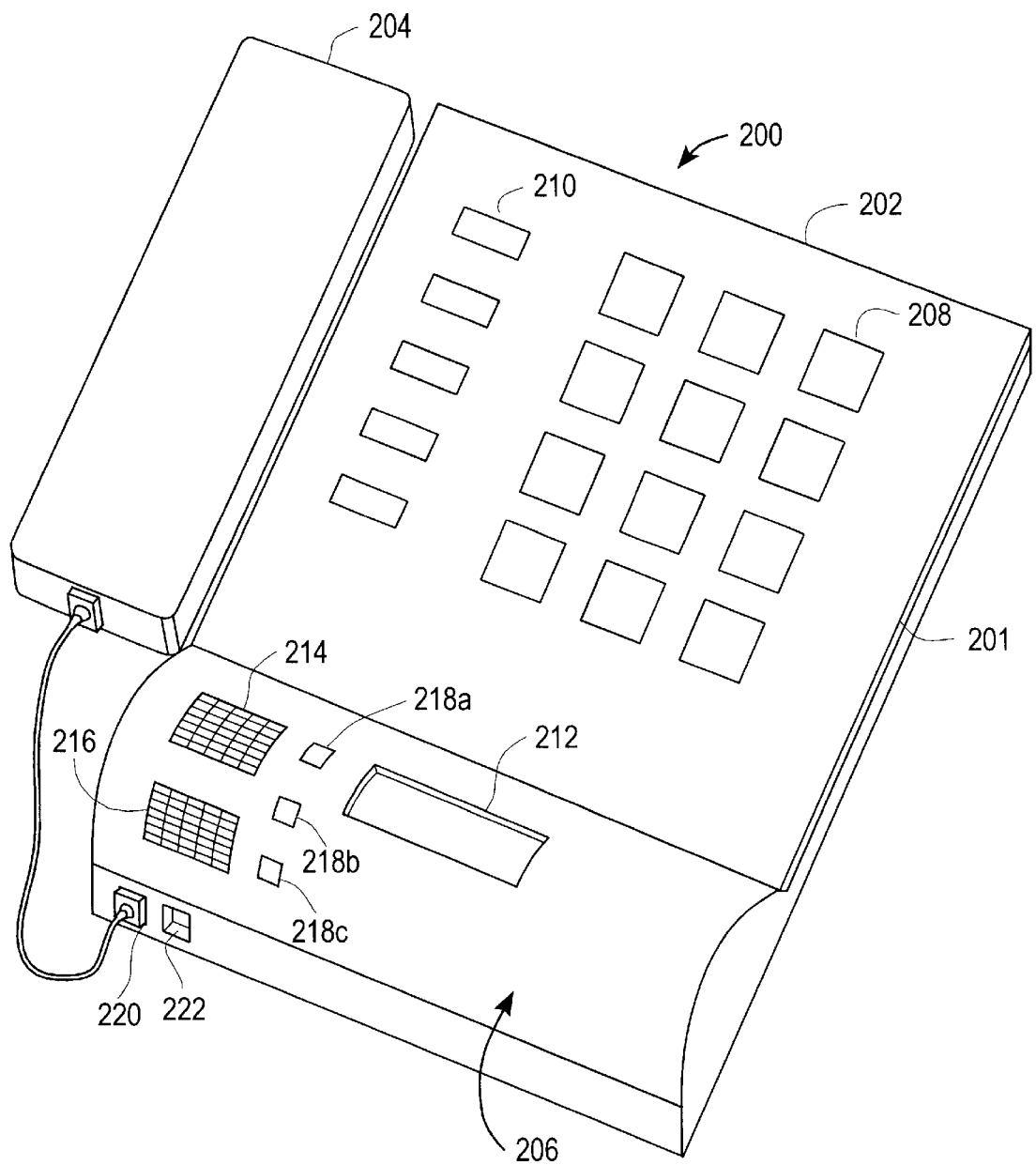
FIG. 2 is a diagram illustrating a mousepad telephone according to a second embodiment of the present invention.

An alternative embodiment of a mousepad according to the present invention is illustrated in FIG. 2, and generally identified by reference numeral 200. The mousepad 200 is generally similar to the mousepad 100 (FIG. 1). The mousepad 200 thus includes a working area 202 including a keypad 208 and one or more function keys 210. The mousepad 200 is further configured such that the working area 202 may be used as a mousepad in a mousepad mode and used as a telephone input device via the keypad 208 in a telephone mode. A control unit 206 is disposed adjacent the working area 202. The control unit 206 is configured as a wrist rest for a user using a mouse on the working area 202. The control unit 206 includes a microphone 214 and a speaker 216. The speaker and the microphone 214, 216 provide for speaker phone functionality. The control unit 206 further includes one or more function switches 218a–c and a viewing window 212. In addition, one or more jacks 220, 222 may be provided. Finally, a handset 204 may be provided coupled to one of the RJ-11 jacks 220. One of the function switches 218a–218c may be used, for example, to switch between a speaker phone and handset mode.

Turning now to FIG. 31 a diagram illustrating a side view of the mousepad of FIG. 1 and FIG. 2 is shown. As shown, the mousepad is disposed to receive a mouse 124, illustrated in phantom. As noted above, the control unit 106 may be used as a wrist rest. As shown, the mousepad includes a first layer 130 disposed on top of a keypad layer 132; a third compressible layer 134 is also provided. Keys of the keypad 108 are disposed immediately beneath the first layer 130. One or more flexible leads such as copper traces 128, may be provided from the keys of a keypad 108 to a telephone controller 126, typically embodied within the control unit 106. The keys of the keypad 108 may be embodied as known capacitive switches, as will be discussed in greater detail below. The first layer 130 may be formed of an insulative mylar material for easy viewing and adapted to effectively receive the mouse 124. The layer 134 may be any suitable non-skid material such as neoprene.

Turning now to FIGS. 4A and 4B, exemplary capacitive switches for use in the working area 102 are illustrated. In particular, turning now to FIG. 4A, a capacitive switch 108a includes an external electrically conductive capacitive touch plate 400 and a pair of internal electrically conductive drive and sense plates 402, 404. The plates 400 and 402, 404 may be formed on a single flexible sheet of dielectric material such as mylar tape or the like.

Conductive paths connecting the electrically conductive capacitive plates 400, 402, 404 may be formed on a flat cable connector to the telephone controller 126. The telephone controller 126 is arranged to apply drive signals and sense and utilize the actuation of the respective capacitive switches.

Electrically, each plate 402, 404 forms a capacitor with the plate 400 disposed on the opposite side of the tape, the two capacitors thus formed being in series electrically. Thus, a signal applied to a drive plate 402 is loaded to ground when the external plate 400 is physically touched and thus conductively coupled to ground by a user. This lowers the level of the output signal sense plate 404. This change in level of the output signal is sensed by the control circuit 126 as signifying a switch operation.

In particular, the operation of each capacitive switch is as follows: The drive plates 402 are driven with a signal from the control unit 126. The applied signal enters each touch pad 400 from a drive pad 402 and exits through an associated sense pad 404. This continues until a touch pad 400 is touched by an operator grounding the pad. This greatly reduces the level of the signal from the sense pad 404, which is detected by the electronic circuit. The electrically conductive capacitive plates 400, 402, 404 and conductive paths may be deposited on a clear tape by sputtering or vapor deposition of transparent films of gold or other suitable electrically conductive materials. Thus, the entire pad may be made transparent except for any desired indicia, legends and designs which may be applied using any suitable non-conductive paint. The unitary capacitive touch panel thus formed, may be used by affixing it to any suitable backing member formed of non-conductive material by means of a non-conductive adhesive as will be described in greater detail below.

Figure 5A:
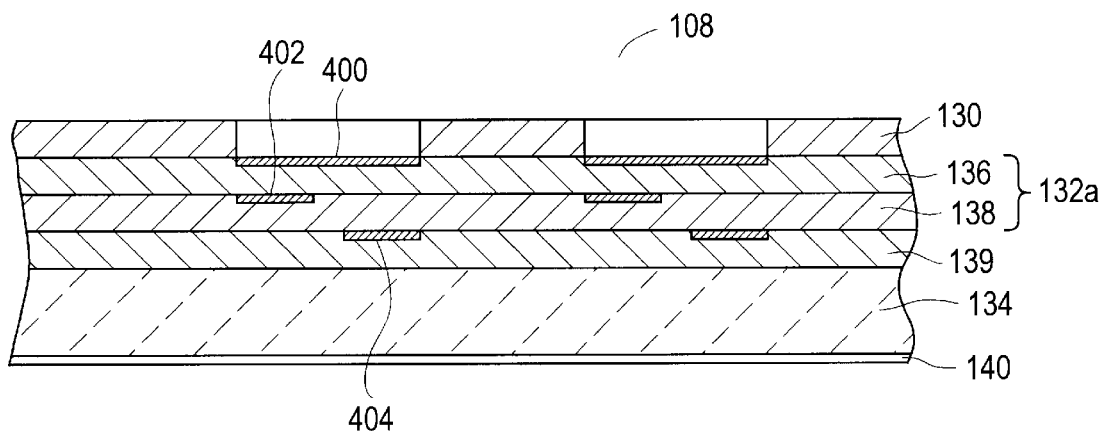
FIGS. 5A and 5B are partially sectioned side views of mousepads according to the embodiments of FIGS. 4A and 4B.

FIG. 5A illustrates an embodiment of the invention employing the capacitive switch of FIG. 4A. The keypad 108 may be formed of two sheets of a dielectric material such as mylar tape 138 and 136, or the like, affixed together by means of a non-conductive adhesive. The internal capacitive segments or plates 402, 404 as well as the electrically conductive paths 128 connected thereto, are disposed on opposite sides of the tape 138. The touch plates 400 are formed on the tape 136. Thus, the capacitive plates 402, 404 of each switch are separated by the thickness of tape 138 and from the plates 400 by the thickness of the tape 136. The flexible keypad 108 may be affixed to a non-conductive backing member 139. A protective transparent and non-conductive coating of a flexible dielectric material 130 may be applied to front face of the keypads around the touch plates 400 to protect the panels from wear. In addition, the keypads 108 may be affixed to a compressible layer 134 by a suitable non-conductive adhesive. The layer 134 may be embodied in, for example, neoprene. In addition, a further layer 140 may be provided. The layer 140 may be any suitable non-skid material; alternatively, it may be omitted and the non-skid neoprene of layer 134 employed.

Figure 5B:
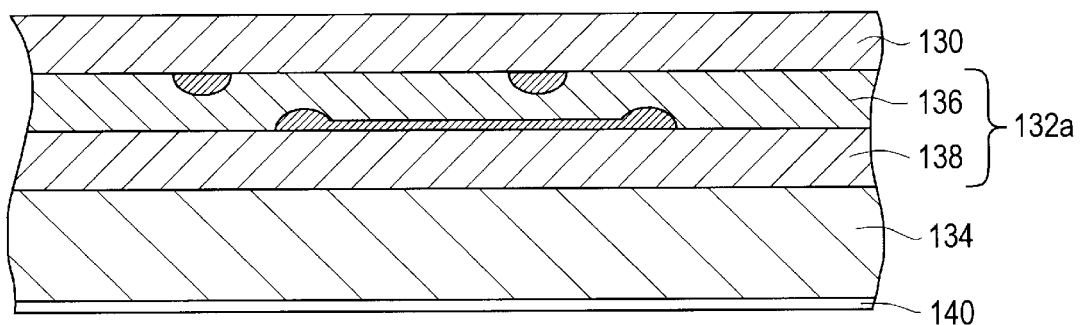

Turning now to FIGS. 4B and 5B, an alternative embodiment of the capacitive switch and keypad 108 are illustrated. The capacitive plates 406, 408 and interconnecting circuitry are embodied as fringe effect capacitive switches, which may be disposed on the same side or on opposite sides of a panel 136. The inter-digital members of the capacitive plates may be printed or otherwise formed on opposite sides of a flexible dielectric tape 136. The completed touch panel can be used by affixing it to any non-conductive backing member 138 by means of a non-conductive adhesive or the like. The exposed capacitive member plates are then covered with a second transparent flexible tape 130 bearing any desired indicia on the inside surface. The tape 130 is also secured to the tape 136 by means of a non-conductive adhesive.

When the smooth surface of the panel 130 is touched, the switch is capacitively coupled to ground, the operator's fingers serving as a grounded capacitive plate. This sharply decreases the switch capacitance, causing a change in signal level which is detected by suitable control circuitry 136 indicating a capacitive switch operation as is well known. The entire switch may be affixed to a neoprene layer 134. As above, an additional non-skid layer 140 may further be provided.

Figure 6:
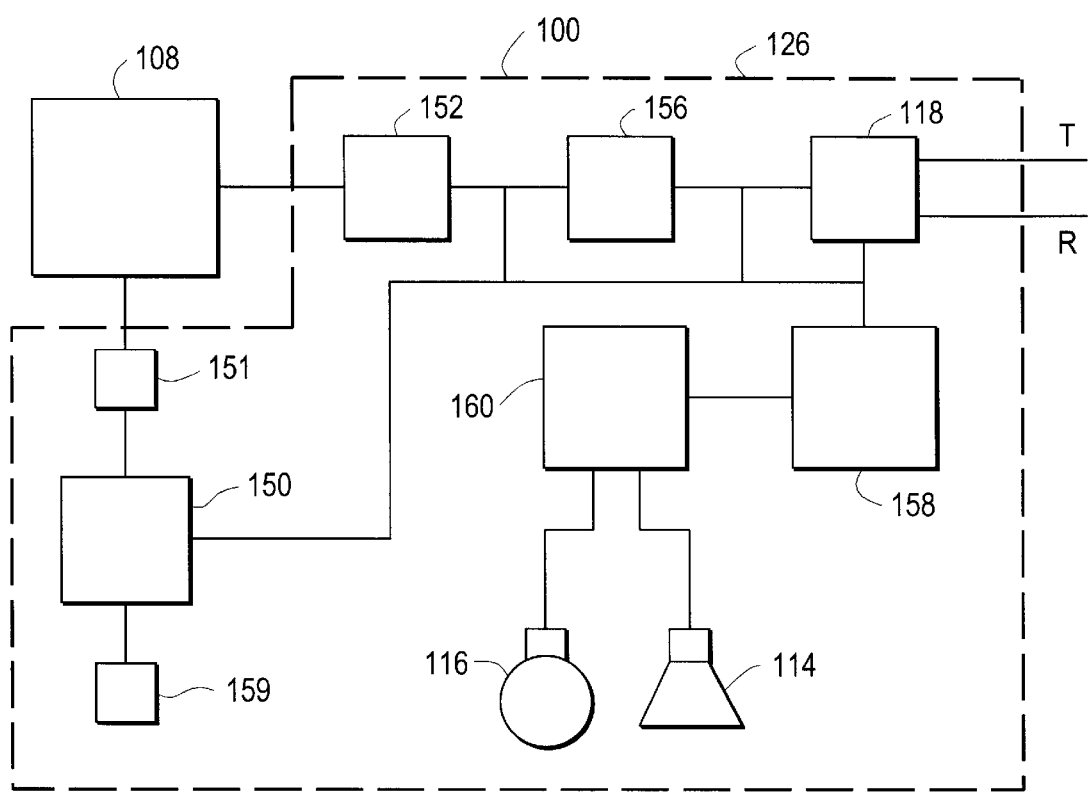
FIG. 6 is a block diagram of a mousepad according to an embodiment of the present invention.

Turning now to FIG. 6, a block diagram illustrating the mousepad 100 according to an embodiment of the present invention is shown. The mousepad 100 includes a telephone controller 126 coupled to the keypad 108. The telephone control circuit includes a DTMF generator 152, a tone ringer 156, a central processing unit 150, a speech network 160, voltage regulator 158, hook switch 118, speaker 114 and microphone 116. A driver/sensing unit 151 may be provided for driving the capacitive keypad 108. In addition, a radio transceiver 159 may be provided coupled to the CPU. The radio transceiver 159 is used in an embodiment in which the mousepad 100 is embodied as a wireless telephone. The voltage regulator 158 is responsible for providing a constant level of voltage and current to the internal circuitry. The speech network 160 interfaces the microphone and speaker to the two-wire telephone line. The DTMF dialer 152 is responsive to pressing the keypad 108. The resulting tones from the DTMF dialer are provided to the tone ringer 156 to provide the appropriate two-tone signal. The CPU 150 is configured to provide control functionality including, for example, number memory and recall, visual digit display, clock, call-back indicators, automatic redial and answering system control. As discussed above, the mousepad 100 is operable in a mouse mode or a telephone mode. The telephone mode is selectable by activating the switch hook 118. Activating the switch hook 118 may include lifting a handset 104 (FIG. 2) or may include activating a physical switch on the control unit 106.

Figure 7:
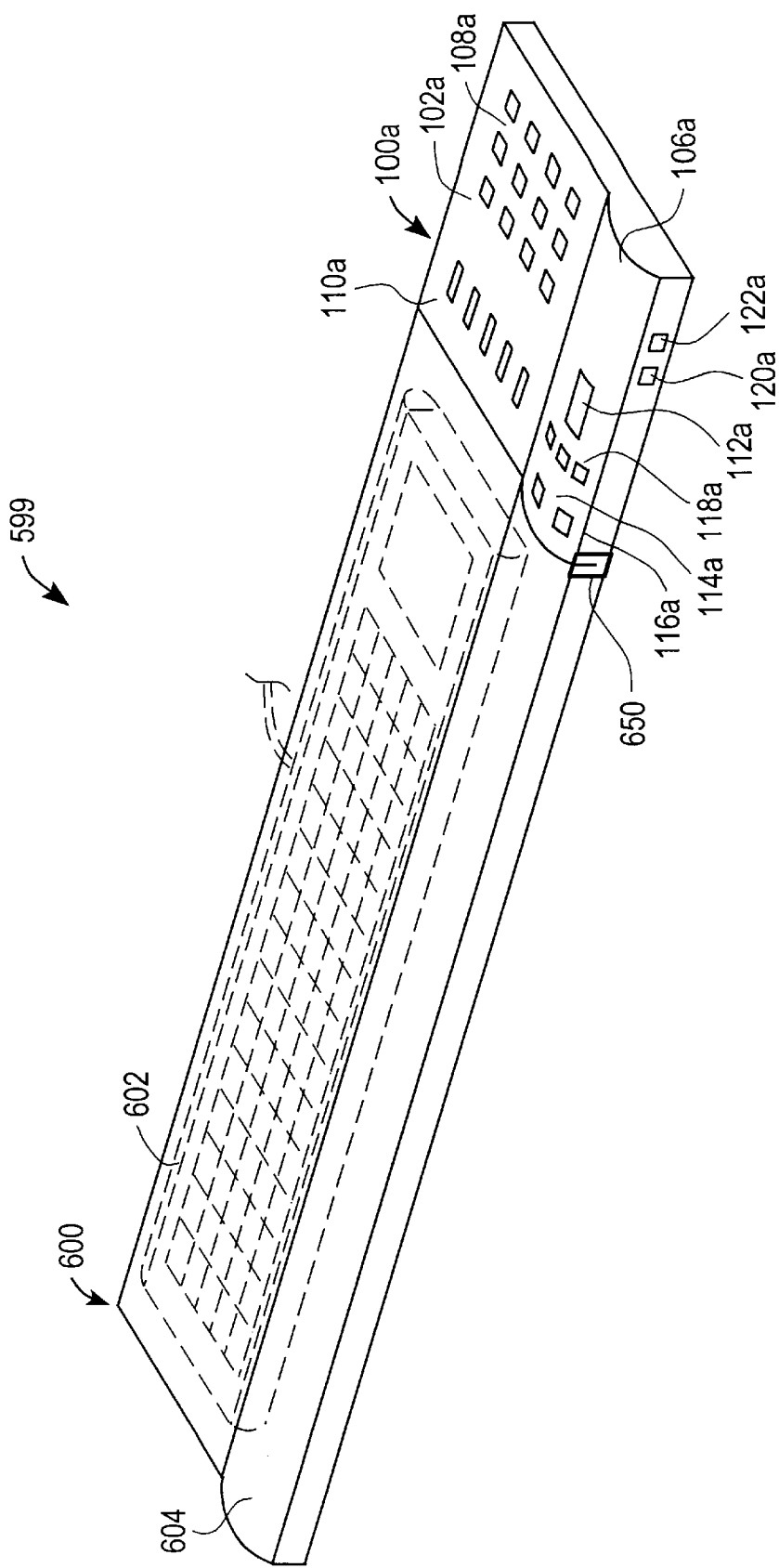
FIG. 7 is a diagram of a mousepad integrated with a keyboard platform according to the present invention.

Turning now to FIG. 7, a diagram of a keyboard platform 599 including a mousepad 100 having a telephone integrated therewith is illustrated. The keyboard platform 599 includes a generally rectangular keyboard rest 600 adapted to receive a keyboard 602 thereon. The surface of the keyboard rest may be covered with a textured material so as to prevent the keyboard 602 from slipping.

The keyboard rest 600 further includes a raised wrist rest 604. The wrist rest 604 may be configured such that the height of the wrist rest above the keyboard platform 600 is approximately the same as the height of the keyboard 602. The wrist rest 604 may be formed from either a pliable or rigid material.

In addition, a mousepad telephone 100 is formed to one side of the keyboard rest 600 and is configured similarly to the mousepad of FIG. 1. In particular, the mousepad 100*a* may include a keypad 108*a* and function keys 110*a* formed integrally with the working area 102*a*. A control unit 106*a* may be provided which, as in FIG. 1, may include a speaker and microphone 114, 116 function such as switch hook keys 118 and a view screen 112, as well as RJ-11-type jacks 120, 122. The control unit 106*a* may be formed such that it appears to be merely an extension of the wrist rest 604 of the keyboard platform 600. The mousepad telephone 100 may be joined to the keyboard rest along an entire edge, or may be joined at a pivot 650, as is known in the art.

Figure 8:
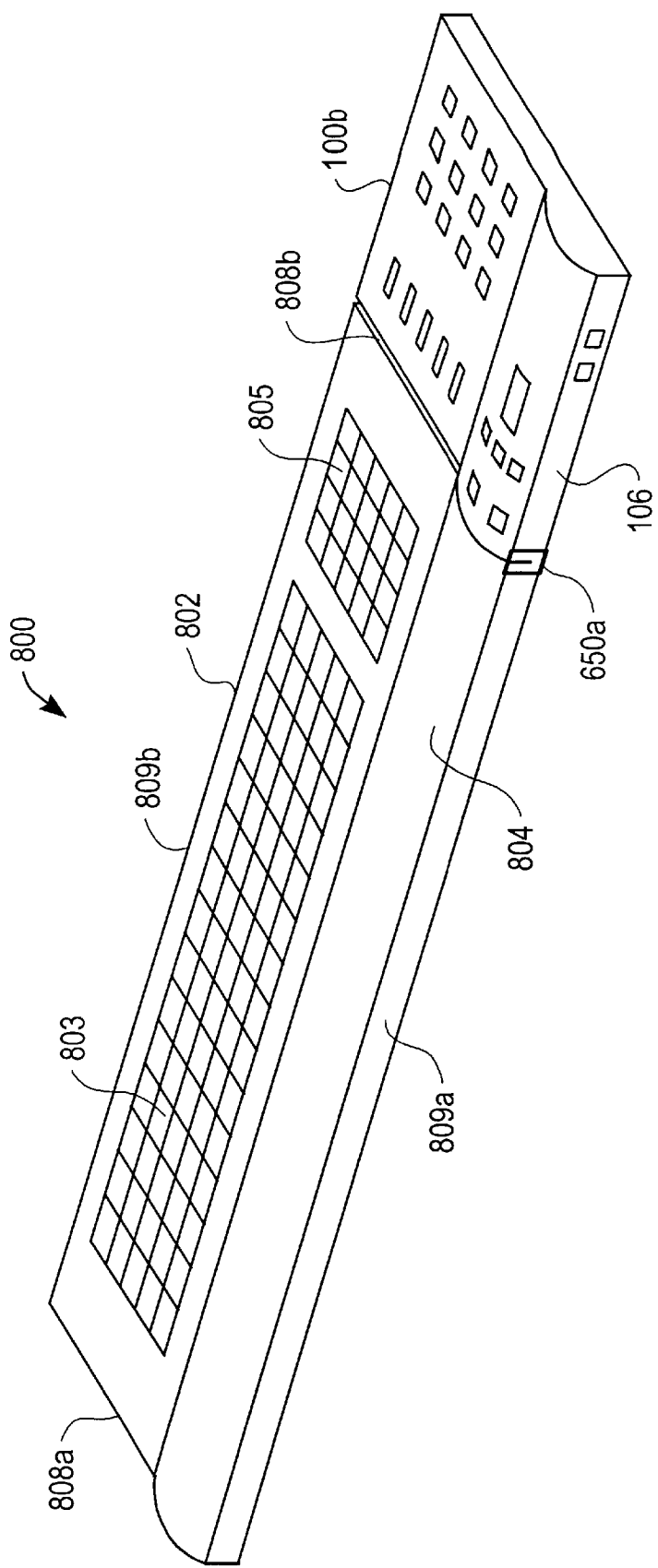
FIG. 8 is a diagram of a mousepad integrated with a keyboard according to the present invention.

Turning now to FIG. 8, a diagram illustrating another embodiment of the present invention is shown. In particular, the keyboard device 800 includes a generally planar housing 802. The housing 802 may be formed from any reasonably rigid material, such as plastic. The housing has first and second side ends 808*a*, 808*b* and a front and rear end, 809*a*, 809*b*, respectively. The housing 802 is adapted to receive one or more sets of keys 803, 805. In one embodiment, the key set 803 forms a standard QWERTY-type key set, and the key set 805 forms a numeric key set. Integrated with and adjacent to the front end 809*a* is a wrist rest 804. The wrist rest 804 is of sufficient size and dimension to permit a user's wrists to rest thereon during keyboard use. Thus, while the wrist rest 804 is illustrated as being generally rectangular and planar, it may be contoured for improved ergonomics. The wrist rest 804 may be formed from a relatively pliable material, or may be formed from the same generally rigid plastic forming the housing 802.

A mousepad 100*b* is integrated with the keyboard 800. As illustrated, the mousepad 100*b* projects from the keyboard housing 802 at the right end 808*b*. Alternatively, the mousepad telephone may be configured to project from the left end 808*a* of the keyboard housing 802. The mousepad 100*b* includes telephone functionality as discussed above, with regard to FIGS. 1–6. Thus, the mousepad includes a control unit 106*b* which may be formed as a wrist rest. In particular, the control unit 106*b* may be configured such that it forms an extension of the wrist rest 804 of the keyboard 800. Again, the mousepad may be joined about a pivot 650*a*.

Figure 9:
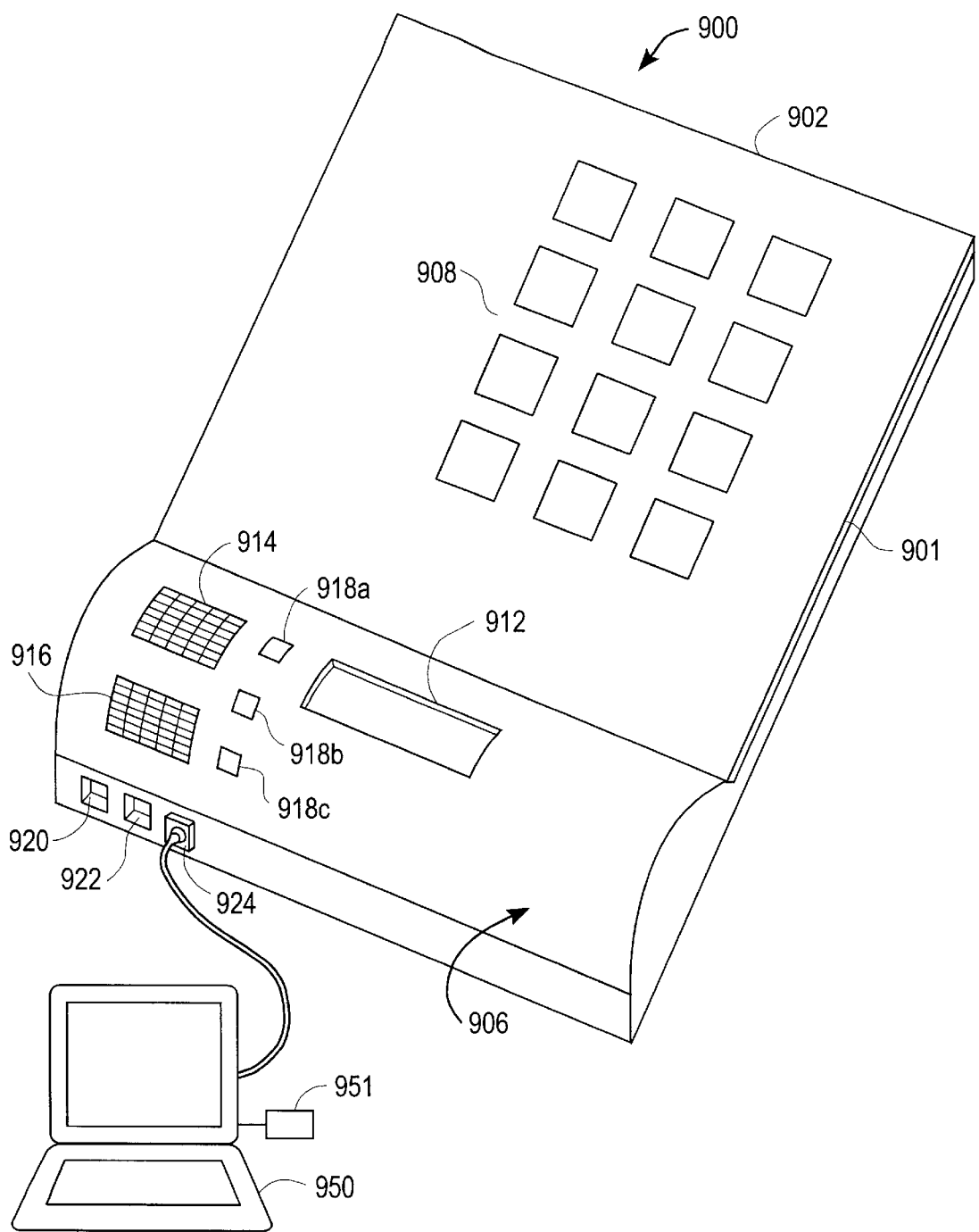
FIG. 9 is a diagram illustrating a mousepad telephone having a computer interface according to an embodiment of the present invention.

An alternative embodiment of a mousepad telephone according to the present invention is illustrated in FIG. 9. In particular, the mousepad telephone of FIG. 9 includes a working area 902 configured to receive a mouse. A control unit 906 is disposed adjacent the working area 102. As shown, the control unit 906 is configured such that it may be used as a wrist rest for a user using a mouse on the working area 902. As shown, the control unit 906 includes audio devices, such as a microphone 914 and a speaker 916. Various function switches 918*a*–918*c* may be provided as also may be a hook switch and viewing window 912. One or more RJ-11 jacks 120, 122 may be provided. In addition, an interface 924 such as a serial interface may be provided between the mousepad 900 and a personal computer 950. The personal computer 950 is a computer such as is well known in the art including a Macintosh or IBM PC compatible computer. The computer 950 includes a known telephone card 951. The mousepad 900 further includes a keyboard 901 similar to the keypads in the above-described embodiments. In the case of mousepad telephone 900, however, the telephone functionality is provided on the computer telephone card 951. Only the signals from the keypad 901 are transferred to the telephone card 951 and voice signals are provided back to the mousepad telephone via the serial interface 924. Thus, the mousepad 900 is configured to provide keypad and sound card-type functionality.

Figure 10:
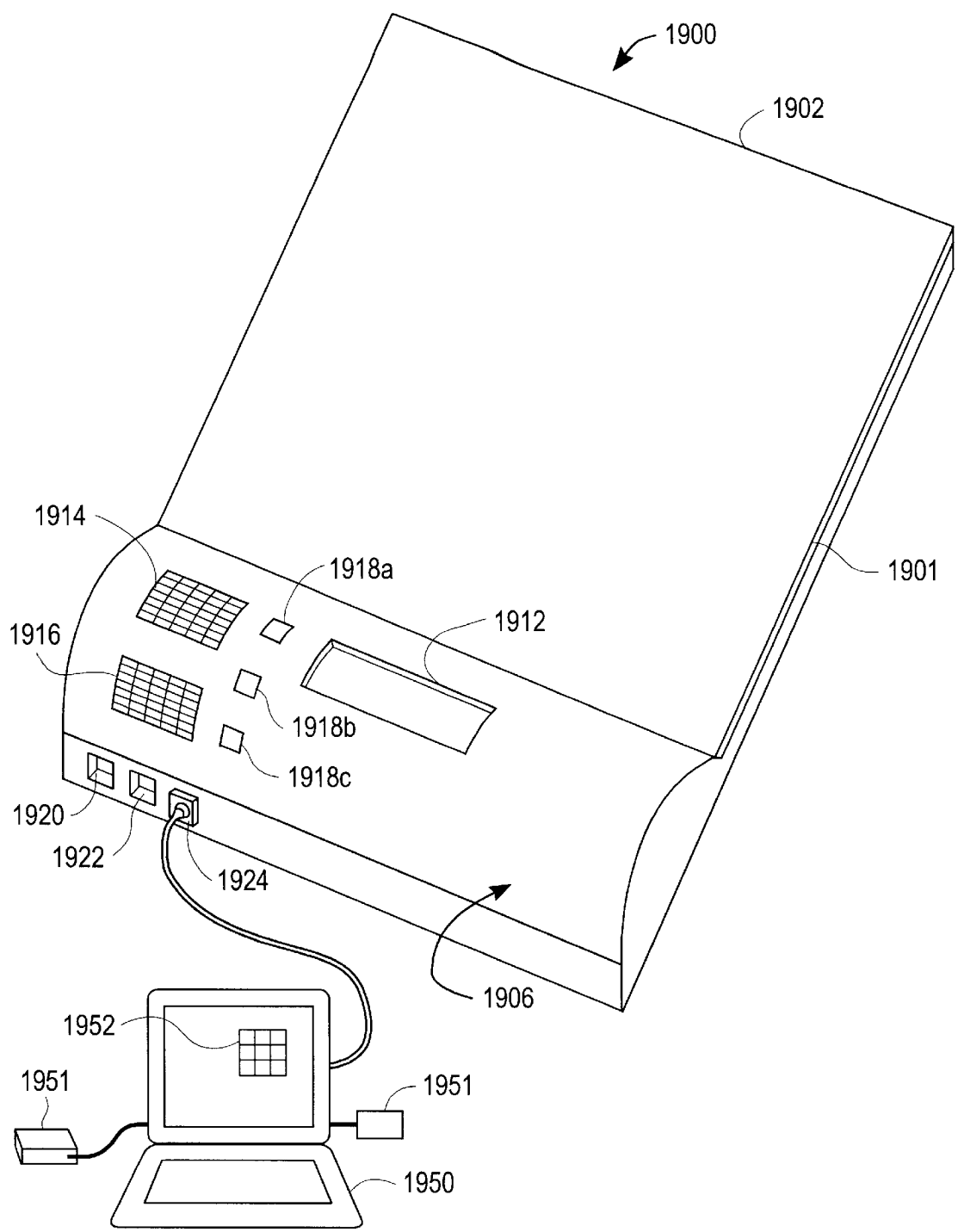
FIG. 10 is a diagram illustrating another mousepad telephone according to the present invention.

A further alternate embodiment is shown in FIG. 10. The mousepad telephone 1900 of FIG. 10 is generally similar to the mousepad telephone 900 of FIG. 9. However, the computer 1950 further includes a software module to produce a virtual keypad 1952 which is activatable by a mouse 1951. The development of such a virtual keypad is well known and may, for example, be based upon Windows 95 or NT software and/or the system described in U.S. Pat. No. 5,457,454 which is hereby incorporated by reference in its entirety.

The invention described in the above detailed description is not intended to be limited to the specific form set forth herein, but on the contrary, it is intended to cover such alternatives, modifications and equivalents as can be reasonably included within the spirit and scope of the appended claims.

What is claimed is:

1. An electronic system comprising:
   a personal computer having a keyboard; and
   a separate associated mousepad device, the mousepad device comprising:
      working area disposed to receive a mouse thereon; and
      a control unit with device controls including an integrated audio device, said control unit adapted to be used as a wrist rest,
   wherein said control unit interfaces to said personal computer to provide telephone audio functionality through said integrated audio device.

2. An electronic system according to claim 1, further including a serial interface for interfacing said mousepad device to said computer.

3. An electronic system according to claim 2, wherein said computer includes a telephony card, and said mousepad device is adapted to transmit and receive audio signals with said telephony card.

4. An electronic system as recited in claim 3, said working area including an integrated keypad.

5. An electronic system as recited in claim 4, said computer adapted to provide a virtual telephone keypad.

* * * * *